(12) United States Patent
Toyoda

(10) Patent No.: US 7,880,771 B2
(45) Date of Patent: Feb. 1, 2011

(54) IMAGING APPARATUS, IMAGE PROCESSING APPARATUS, IMAGE PROCESSING SYSTEM AND IMAGE PROCESSING METHOD

(75) Inventor: Tetsuya Toyoda, Hachioji (JP)

(73) Assignee: Olympus Corporation, Tokyo (JP)

( * ) Notice: Subject to any disclaimer, the term of this patent is extended or adjusted under 35 U.S.C. 154(b) by 1734 days.

(21) Appl. No.: 11/073,101

(22) Filed: Mar. 4, 2005

(65) Prior Publication Data

US 2005/0207629 A1   Sep. 22, 2005

(30) Foreign Application Priority Data

| Mar. 16, 2004 | (JP) | ................. 2004-075086 |
| Mar. 18, 2004 | (JP) | ................. 2004-077631 |
| Mar. 18, 2004 | (JP) | ................. 2004-077632 |

(51) Int. Cl.
*H04N 5/235* (2006.01)

(52) U.S. Cl. .............. 348/222.1; 348/254; 348/362

(58) Field of Classification Search ........... 348/207.99, 348/207.1, 207.2, 207.11, 221.1, 222.1, 223.1, 348/362–366, 671; 358/521
See application file for complete search history.

(56) References Cited

U.S. PATENT DOCUMENTS

| 7,352,398 | B2 * | 4/2008 | Sano ..................... 348/254 |
| 7,375,758 | B2 * | 5/2008 | Muramatsu ............. 348/364 |
| 2002/0036697 | A1 * | 3/2002 | Mori et al. .............. 348/229 |
| 2002/0106123 | A1 * | 8/2002 | Inoue ..................... 382/168 |
| 2003/0035101 | A1 | 2/2003 | Yuasa |
| 2004/0085459 | A1 * | 5/2004 | Hoshuyama et al. ..... 348/223.1 |
| 2004/0179111 | A1 * | 9/2004 | Hattori ................... 348/222.1 |
| 2005/0024522 | A1 * | 2/2005 | Nakami et al. .......... 348/362 |

| 2005/0190272 | A1 * | 9/2005 | Takahashi et al. ........ 348/222.1 |

FOREIGN PATENT DOCUMENTS

| EP | 0 838 939 | 4/1998 |
| EP | 1523182 | 4/2005 |
| JP | 01-222574 | 9/1989 |
| JP | 5-246069 | 9/1993 |
| JP | 05 323750 | 12/1993 |
| JP | 8-242469 | 9/1996 |
| JP | 2000-227619 | 8/2000 |
| JP | 2001-024927 | 1/2001 |
| JP | 2001-078090 | 3/2001 |
| JP | 2001-136543 | 5/2001 |
| JP | 2002-084455 | 3/2002 |

(Continued)

OTHER PUBLICATIONS

Decision of Rejection for Japanese Patent Application No. 2004-075086, mailed Sep. 1, 2009 (4 pgs.) with translation (5 pgs.).

(Continued)

*Primary Examiner*—Tuan Ho
(74) *Attorney, Agent, or Firm*—Straub & Pokotylo; John C. Pokotylo

(57) ABSTRACT

An imaging apparatus comprises an image acquiring section. The image acquiring section images a subject based on an exposure reference value as a reference for an exposure in imaging to acquire image data by. An image outputting section outputs the image data obtained by the image acquiring section together with the exposure reference value.

35 Claims, 8 Drawing Sheets

FOREIGN PATENT DOCUMENTS

| | | |
|---|---|---|
| JP | 2002-330388 | 11/2002 |
| JP | 2003-242163 | 8/2003 |
| JP | 2003-244626 | 8/2003 |
| JP | 2003-274427 | 9/2003 |
| JP | 2003-348339 | 12/2003 |
| WO | WO 2004/008754 | 1/2004 |

OTHER PUBLICATIONS

Final Notice of Rejection for Japanese Patent Application No. 2004-077632, mailed Sep. 1, 2009 (2 pgs.) with translation (3 pgs.).
European Search Report to European Patent Application No. 05005144.0, dated Jan. 15, 2008 (4 pgs.).
Notification of Reasons for Rejection for Japanese Patent Application No. 2004-077631, mailed Feb. 10, 2009 (2 pgs.) with translation (2 pgs.).
Notification Reasons for Rejection for Japanese Patent Application No. 2004-077632, mailed Feb. 10, 2009 (3 pgs.) with translation (3 pgs.).
Notification of Reasons for Rejection for Japanese Patent Application No. 2004-075086, mailed Feb. 17, 2009 (2 pgs.) with translation (2 pgs.).
Chinese Office Action for Application No. 2005100538763, dated Apr. 6, 2007 (7 pgs.) with translation (6 pgs.).
Final Notice of Rejection for Japanese Patent Application No. 2004-077631, mailed Apr. 28, 2009 (2 pgs.) with translation (2 pgs.).

* cited by examiner

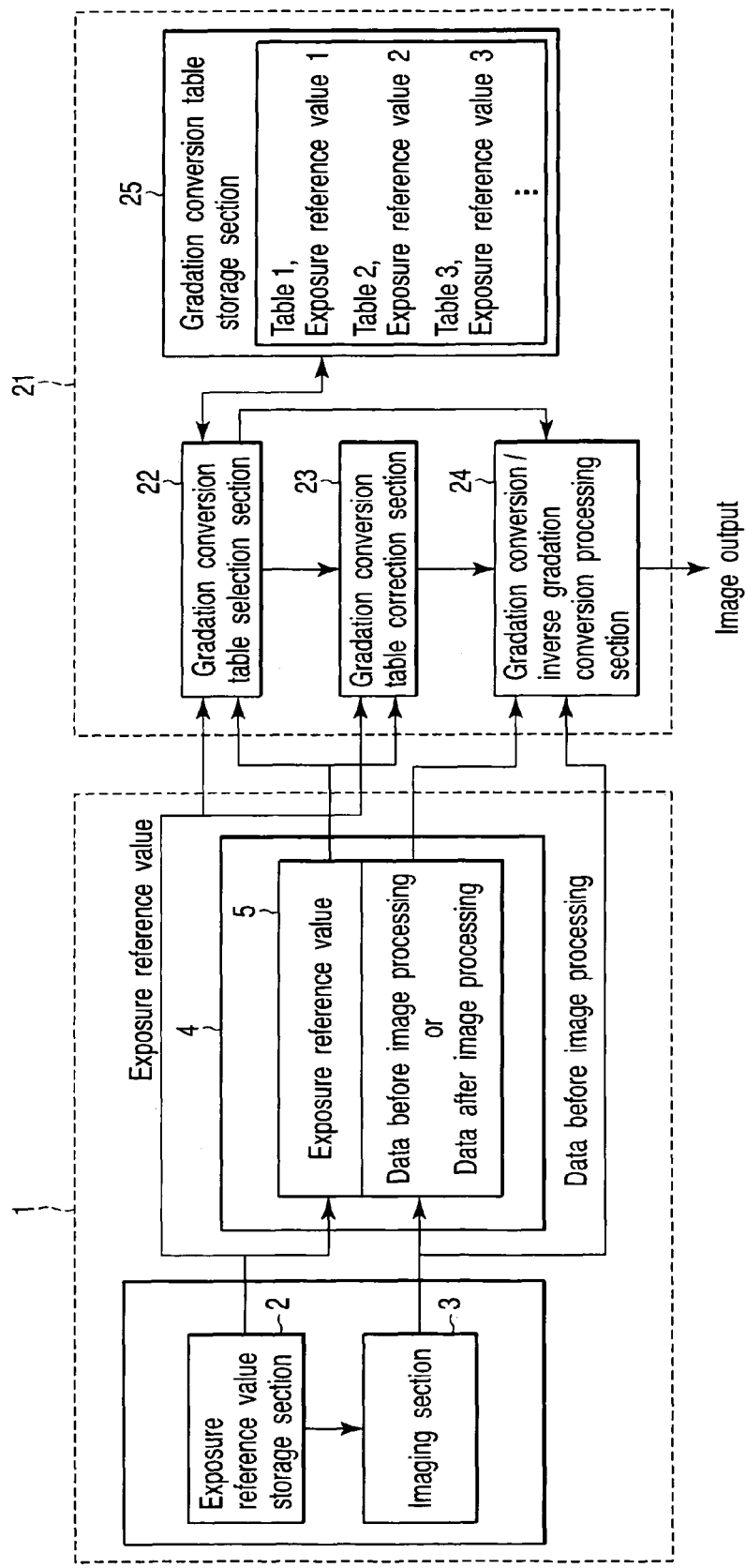
F I G. 1

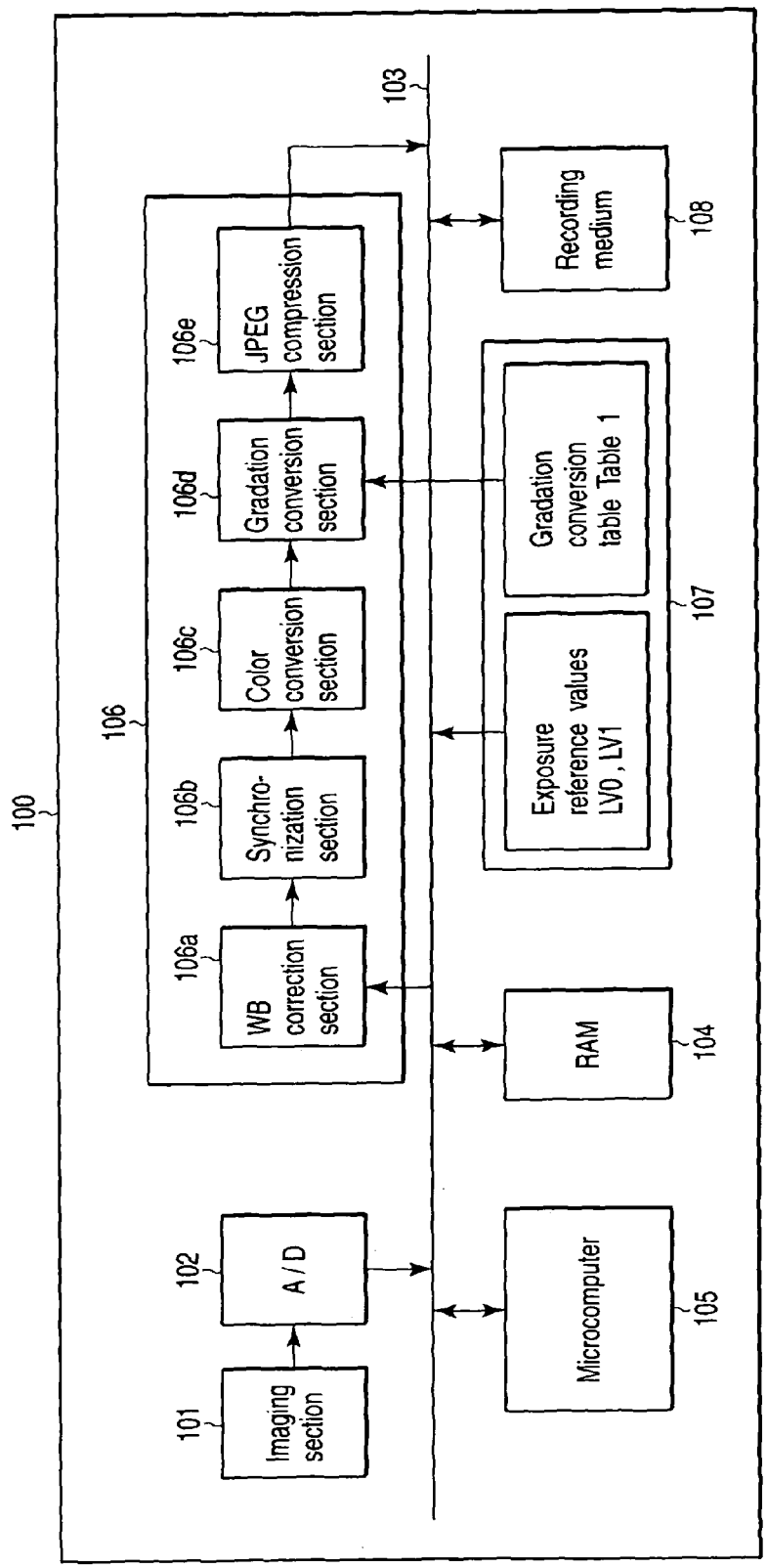
F I G. 2

IMAGING APPARATUS, IMAGE PROCESSING APPARATUS, IMAGE PROCESSING SYSTEM AND IMAGE PROCESSING METHOD

CROSS-REFERENCE TO RELATED APPLICATIONS

This application is based upon and claims the benefit of priority from prior Japanese Patent Applications No. 2004-075086, filed Mar. 16, 2004; No. 2004-077631, filed Mar. 18, 2004; and No. 2004-077632, filed Mar. 18, 2004, the entire contents of all of which are incorporated herein by reference.

BACKGROUND OF THE INVENTION

1. Field of the Invention

The present invention relates to an imaging apparatus, an image processing apparatus, an image processing system and an image processing method.

2. Description of the Related Art

In conventional digital cameras, there has been known a digital camera provided with a function which directly stores image data yet to be subjected to image processing (which will be referred to as raw data hereinafter) in a recording medium or the like. The raw data is a kind of data obtained by converting an output from an imaging element into a digital image as it is. Therefore, the raw data cannot be viewed or printed as an image if no processing is applied thereto. In that sense, it is assumed that the raw data is subjected to image processing in a dedicated image processing apparatus or a PC application having an image processing function.

Usually, elements (e.g., gradation characteristics, color reproduction, and white balance) concerning image quality when performing image processing in a digital camera are determined at the time of image capturing. Conversion from the raw data into image data subjected to image processing is irreversible. Again changing gradation characteristics, white balance or the like after image processing may lead to a deterioration in image quality as compared with the case where gradation conversion or white balance processing is directly applied to the raw data. On the other hand, when the raw data is subjected to image processing after image capturing, elements concerning an image quality can be freely changed without a deterioration in image quality, and this is recognized as a utility value of the raw data.

Here, the gradation characteristics are determined based on an exposure level when image-capturing raw data and a gradation conversion table when performing gradation conversion. The exposure level is determined when capturing an image. On the other hand, as a technique of determining the gradation conversion table, there have been proposed various techniques, e.g., a technique which uses data stored in an image processing apparatus in advance, a technique which analyzes raw data by an image processing apparatus and generates an appropriate gradation conversion table in accordance with a result of this analysis, a technique which transfers a gradation conversion table attached to raw data to an image processing apparatus, and others. Further, Jpn. Pat. Appln. KOKAI Publication No. 2003-244626 proposes a technique which transfers imaging gamma information indicative of a gamma correction quantity based on imaging characteristics of an imaging apparatus to an image processing apparatus and updates a gradation conversion table previously stored in the image processing apparatus in accordance with output characteristics base on the transferred information.

Furthermore, as conventional digital cameras, one provided with a function which applies image processing and records obtained data in a recording medium or the like is commonly used. Moreover, there has been known a PC application software (a PC application) or the like which reads recorded image data and applies image processing in accordance with preferences of a user. As a content of this image processing, there is, e.g., a change in white balance or in color reproduction. It is preferable that such processing is carried out with respect to data which is linear ($\gamma=1$) with respect to a light quantity of a subject rather than data subjected to gradation conversion. Therefore, when performing processing which changes the white balance by a PC application or the like, it is preferable that image data is converted into data which is linear with respect to a light quantity in accordance with inverse characteristics of gradation conversion characteristics applied to the image data and then the white balance or the like is changed, and thereafter gradation conversion is again conducted.

In order to perform such inverse conversion of gradation conversion effected in a camera, characteristics of gradation conversion performed in the camera must be transferred to an image processing apparatus. As techniques which realize this transfer, there have been proposed various techniques such as a technique which previously stores a predetermined gradation conversion table in an image processing apparatus, a technique which transfers a gradation conversion table attached to image data to an image processing apparatus, and others.

Furthermore, the exposure of an image is usually determined at the time of capturing an image. There has been proposed an apparatus provided with a function which demonstrates an effect which is equivalent to the exposure correction in image capturing when raw data is developed. Specifically, a technique which simulates the exposure correction in image capturing by amplifying captured raw data based on a predetermined gain is commonly used.

The exposure correction is generally represented by an exponentiation of 2, and raw data after the exposure correction in each pixel can be calculated by the following expression.

Raw data (after exposure correction)=Raw data (before exposure correction)×2 (exposure correction value)

By performing predetermined image processing including gradation conversion to raw data with which exposure correction is simulated, an image closer to an image subjected to exposure correction in image capturing can be obtained.

Moreover, there are a technique which changes an apparent exposure by varying gradation conversion characteristics (more specifically, a gradation conversion table) rather than applying a predetermined gain to raw data like the above expression, a technique which previously stores a plurality of gradation conversion tables in an image processing apparatus, and a technique which transmits a plurality of gradation conversion tables attached to raw data to an image processing apparatus. For example, Jpn. Pat. Appln. KOKAI Publication No. 2003-242163 proposes that image data and its attached information (raw data information, digital exposure correction processing information and others) are created as one file on an image recording apparatus side and processing with respect to the image data is changed based on read information on an information processing apparatus side.

BRIEF SUMMARY OF THE INVENTION

According to a first aspect of the present invention, there is provided an imaging apparatus comprising: an image acquiring section which images a subject based on an exposure reference value as a reference for an exposure in imaging to acquire image data by; and an image outputting section which outputs the image data obtained by the image acquiring section together with the exposure reference value.

According to a second aspect of the present invention, there is provided an image processing apparatus comprising: an image inputting section which inputs image data; an exposure reference value inputting section which inputs an exposure reference value as a reference for an exposure when the image data is imaged; a gradation conversion table storing section which stores gradation conversion tables corresponding to the plurality of exposure reference values; a gradation conversion table selecting section which selects a gradation conversion table corresponding to the exposure reference value input by the exposure reference value inputting section from the plurality of gradation tables stored in the gradation conversion table storing section; and a gradation conversion processing section which performs gradation conversion processing with respect to the image data input by the image inputting section based on the gradation conversion table selected by the gradation conversion table selecting section.

According to a third aspect of the present invention, there is provided an image processing apparatus comprising: an image inputting section which inputs image data before gradation conversion processing is performed; an exposure reference value inputting section which inputs an exposure reference value as a reference for an exposure when the image data is imaged; an indicating section which indicates an exposure correction value which is used for correcting an exposure of an image; an exposure reference value changing section which changes the exposure reference value based on the exposure correction value indicated by the indicating section; a gradation conversion table storing section which stores gradation conversion tables corresponding to the plurality of exposure reference values; a gradation conversion table selecting section which selects a gradation conversion tables corresponding to the exposure reference value changed by the exposure reference value changing section from the plurality of gradation tables stored in the gradation conversion table storing section; and a gradation conversion processing section which performs the gradation conversion processing with respect to the image data input by the image inputting section based on the gradation conversion table selected by the gradation conversion table selecting section.

According to a forth aspect of the present invention, there is provided an image processing apparatus comprising: an image inputting section which inputs image data before gradation conversion processing is performed; an exposure reference value inputting section which inputs an exposure reference value as a reference for an exposure when the image data is imaged; a gradation conversion table storing section which stores gradation conversion tables corresponding to the plurality of exposure reference values; a gradation conversion table selecting section which selects a gradation conversion table corresponding to the exposure reference values input by the exposure reference value inputting section from the plurality of gradation tables stored in the gradation conversion table storing section; an indicating section which indicates an exposure correction value which is used to correct an exposure of an image; an exposure reference value changing section which changes the exposure reference value based on the exposure correction value indicated by the indicating section; a gradation conversion table correcting section which corrects the gradation conversion table selected by the gradation conversion table selecting section in accordance with the exposure reference value changed by the exposure reference value changing section; and a gradation conversion processing section which performs the gradation conversion processing with respect to the image data input by the image inputting section based on the gradation conversion table corrected by the gradation conversion table correcting section.

According to a fifth aspect of the present invention, there is provided an image processing system comprising: an imaging apparatus comprising: an image acquiring section which images a subject based on an exposure reference value as a reference for an exposure in imaging to acquire image data; and an image outputting section which outputs the image data acquired by the image acquiring section together with the exposure reference value; and an image processing apparatus comprising: an inputting section which inputs the image data and the exposure reference value output by the image outputting section; a gradation conversion table storing section which stores gradation conversion tables corresponding to the plurality of exposure reference values; a gradation conversion table selecting section which selects a gradation conversion table corresponding to the exposure reference value input by the inputting section from the plurality of gradation tables stored in the gradation conversion table storing section; and a gradation conversion processing section which performs gradation conversion processing with respect to the image data input by the inputting section based on the gradation conversion table selected by the gradation conversion table selecting section.

According to a sixth aspect of the present invention, there is provided an image processing system comprising: an imaging apparatus comprising: an image acquiring section which images a subject to acquire image data before at least gradation conversion processing is performed; an exposure reference value storing section which stores an exposure reference value as a reference of an exposure in imaging by the image acquiring section; and an image outputting section which outputs the image data acquired by the image acquiring section together with the exposure reference value stored in the exposure reference value storing section; and an image processing apparatus comprising: an inputting section which inputs the image data and the exposure reference value output by the image outputting section; an indicating section which indicates an exposure correction value which is used to correct an exposure of an image; an exposure reference value changing section which changes the exposure reference value based on the exposure correction value indicated by the indicating section; a gradation conversion table storing section which stores gradation conversion tables corresponding to the plurality of exposure reference values; a gradation conversion table selecting section which selects a gradation conversion table corresponding to the exposure reference value changed by the exposure reference value changing section from the plurality of gradation tables stored in the gradation conversion table storing section; and a gradation conversion processing section which performs the gradation conversion processing with respect to the image data input by the inputting section based on the gradation conversion table selected by the gradation conversion table selecting section.

According to a seventh aspect of the present invention, there is provided an image processing system comprising: an imaging apparatus comprising: an image acquiring section which images a subject to acquire image data before at least gradation conversion processing is performed; an exposure reference value storing section stores an exposure reference value as a reference for an exposure in imaging by the image acquiring section; and an image outputting section which outputs the image data acquired by the image acquiring section together with the exposure reference value stored in the exposure reference value storing section; and an image processing apparatus comprising: an inputting section which inputs the image data and the exposure reference value output by the image outputting section; a gradation conversion table storing section which stores gradation conversion tables corresponding to the plurality of exposure reference values; a gradation conversion table selecting section which selects a gradation conversion table corresponding to the exposure reference value input by the inputting section from the plurality of gradation tables stored in the gradation conversion table storing section; an indicating section which indicates an exposure correction value which is used to correct an exposure of an image; an exposure reference value changing section which changes the exposure reference value based on the exposure correction value indicated by the indicating section; a gradation conversion table correcting section which corrects the gradation conversion table selected by the gradation conversion table selecting section in accordance with the exposure reference value changed by the exposure reference value changing section; and a gradation conversion processing section which performs the gradation conversion processing with respect to the image data input by the inputting section based on the gradation conversion table corrected by the gradation conversion table correcting section.

According to a eighth aspect of the present invention, there is provided an image processing method comprising: imaging a subject based on an exposure reference value as a reference for an exposure in imaging to acquire image data before at least gradation conversion processing is performed; outputting the acquired image data and the exposure reference value; selecting a gradation conversion table corresponding to the output exposure reference value from a plurality of gradation conversion tables; and performing gradation conversion processing with respect to the output image data based on the selected gradation conversion table.

According to a ninth aspect of the present invention, there is provided an image processing method comprising: imaging a subject to acquire image data before at least gradation conversion processing is performed; outputting the acquired image data and an exposure reference value as a reference for an exposure when an image of the image data is obtained; indicating an exposure correction value which is used to correct an exposure of the image; changing the exposure reference value based on the indicated exposure correction value; selecting a gradation conversion table corresponding to the changed exposure reference value from a plurality of gradation tables; and performing the gradation conversion processing to the output image data based on the selected gradation conversion table.

According to a tenth aspect of the present invention, there is provided an image processing method comprising: imaging a subject to acquire image data before at least gradation conversion processing is performed; outputting the acquired image data and an exposure reference value as a reference for an exposure when an image of the image data is obtained; selecting a gradation conversion table corresponding to the output exposure reference value from a plurality of gradation tables; indicating an exposure correction value which is used to correct an exposure of the image; changing the exposure reference value based on the indicated exposure correction value; correcting the selected gradation conversion table in accordance with the changed exposure reference value; and performing the gradation conversion processing to the output image data based on the corrected gradation conversion table.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a configuration of an image processing system according to an embodiment of the present invention;

FIG. 2 is a block diagram showing a configuration of a digital camera as an example of an imaging apparatus;

DETAILED DESCRIPTION OF THE INVENTION

Figures 3A, 3B:
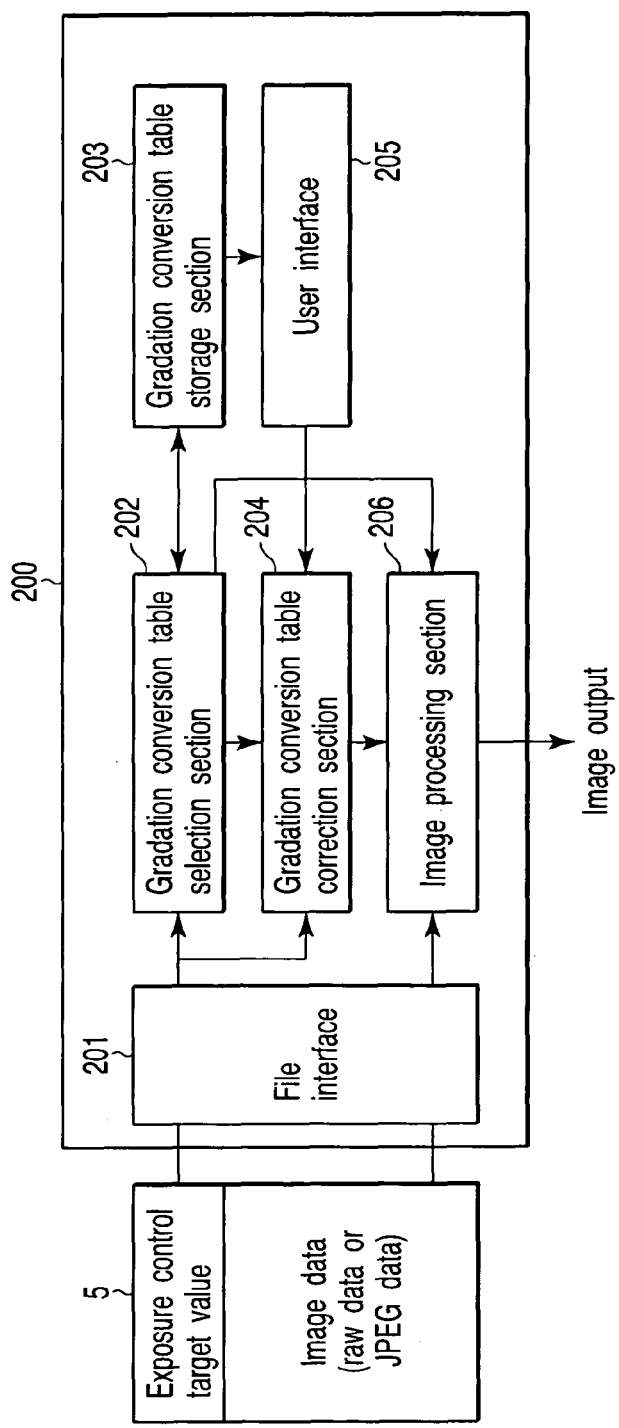
FIG. 3A is a block diagram of a PC as an example of an image processing apparatus.
FIG. 3B is a view showing a table which is used to obtain a gradation conversion table.

An embodiment according to the present invention will now be described hereinafter with reference to the accompanying drawings.

FIG. 1 is a block diagram illustrating a conceptual configuration of an image processing system according to an embodiment of the present invention. An image processing system depicted in FIG. 1 comprises an imaging apparatus 1 and an image processing apparatus 21.

The imaging apparatus 1 will be first explained. The imaging apparatus 1 comprises an exposure reference value storage section 2, an imaging section 3 and a recording medium 4.

In the imaging section 3, imaging of a non-illustrated subject is performed in accordance with an exposure reference value (to be described in detail later) stored in the exposure reference value storage section 2 and image data is thereby acquired. Thereafter, image processing is performed with respect to the image data in accordance with a use application.

After the image data is acquired in the imaging section 3, the exposure reference value is added to header information in the acquired image data in order to generate an image file 5, and this generated image file 5 is recorded in the recording medium 4.

The image processing apparatus 21 will now be described. The image processing apparatus 21 is an image processing apparatus capable of executing gradation conversion processing and processing corresponding to inverse gradation conversion. The image processing apparatus 21 comprises a gradation conversion table selection section 22, a gradation conversion table correction section 23, a gradation conversion/inverse gradation conversion processing section 24, and a gradation conversion table storage section 25. Here, the processing corresponding to inverse conversion of gradation conversion is processing which converts image data subjected to gradation conversion processing into image data which is substantially linear with respect to a light quantity before gradation conversion is applied. In this processing, the processed data does not necessarily match with image data before gradation conversion. However, further appropriate processing can be executed by performing such processing even when processing such as a white balance correction is again effected with respect to image data after image processing. It is to be noted that processing corresponding to inverse conversion of gradation conversion will be simply referred to as inverse gradation conversion processing hereinafter.

The image file 5 generated in the imaging apparatus 1 is input to the image processing apparatus 21. In this embodiment, the exposure reference value stored in the exposure reference value storage section 2 and the image data acquired in the imaging section 3 can be directly input to the image processing apparatus 21 without generating the image file 5 in the imaging apparatus 1.

After the image file 5 is input to the image processing apparatus 21, when gradation conversion processing for an image is commanded by a user, the gradation conversion table selection section 22 selects a gradation conversion table in accordance with the exposure reference value. In this example, as shown in FIG. 1, the gradation conversion table storage section 25 stores a plurality of gradation conversion tables corresponding to a plurality of exposure reference values therein. The gradation conversion table selection section 22 selects a gradation conversion table corresponding to the input exposure reference value from the gradation conversion tables stored in the gradation conversion table storage section 25.

Thereafter, when a gradation conversion table correction is commanded by a user for example, the gradation conversion table correction section 23 corrects the gradation conversion table.

Then, different processing is executed depending on whether image processing (gradation conversion processing) is performed with respect to the image data acquired by the imaging section 3.

When the gradation conversion processing is not effected to the input image data, the gradation conversion/inverse gradation conversion processing section 24 executes the gradation conversion processing for the input image data based on the gradation conversion table selected by the gradation conversion table selection section 22 and corrected by the gradation conversion table correction section 23. In contrast, when the gradation conversion processing is performed with respect to the input image data, the gradation conversion/inverse gradation conversion processing section 24 executes the inverse gradation conversion processing with respect to the input image data based on the gradation conversion table selected by the gradation conversion table selection section 22 and corrected by the gradation conversion table correction section 23.

The image processing system depicted in FIG. 1 will now be described in more detail.

FIG. 2 is a block diagram showing a configuration of a digital camera 100 as an example of the imaging apparatus 1 depicted in FIG. 1. The digital camera 100 illustrated in FIG. 2 comprises an imaging section 101, an analog-to-digital conversion section 102, a bus line 103, an RAM 104, a microcomputer 105, an image processing section 106, an ROM 107 and a recording medium 108.

The imaging section 101 comprises a capturing optical system, an imaging element (a CCD) or the like. The imaging section 101 forms an image of a light beam from a non-illustrated subject on the imaging element through the capturing optical system. Then, the image-formed light beam is converted into an electrical signal in the imaging element. The analog-to-digital conversion section 102 converts an analog image signal output from the imaging section 101 into digital image data. This image data is temporarily stored in the RAM 104 through the bus line 103. It is to be noted that the RAM 104 temporarily stores image data and also temporarily stores various kinds of data at the time of a distance measuring arithmetic operation, a photometric arithmetic operation and others. Image data immediately after output from the analog-to-digital conversion section 102 will be referred to as raw data hereinafter.

Then, different processing is executed depending on whether an image quality mode in image data recording is set to a JPEG mode (an image quality mode in which image processing is effected) or set to a raw mode (an image quality mode in which no image processing is carried out).

When the image quality mode is set to the JPEG mode, the raw data stored in the RAM 104 is input to the image processing section 106 through the bus line 103. The image processing section 106 comprises a white balance (WB) correction section 106a, a synchronization section 106b, a color conversion section 106c, a gradation conversion section 106d, and a JPEG compression section 106e. The WB correction section 106a performs white balance correction processing which adjusts an RGB gain in an image. The synchronization section 106b performs synchronization processing which synchronizes Bayer data. The color conversion section 106c executes a color matrix arithmetic operation which standardizes RGB data. Further, the gradation conversion section 106d performs gradation conversion processing based on the exposure reference value and the gradation conversion table stored in the ROM 107.

The exposure reference value will now be described. The exposure reference value is a value which serves as a reference for an exposure in image capturing. In this embodiment, as the exposure reference value, a value as a target of an exposure control (LV0) and a value obtained by subjecting LV0 to gradation conversion (LV1) are used. Giving a more concrete explanation, LV0 is a pixel value of raw data (i.e., an output from the analog-to-digital conversion section 102) obtained when capturing an image of an even surface under the automatic exposure control, and LV1 is a pixel value after subjecting LV0 to gradation conversion in accordance with a gradation conversion table previously stored in the ROM 107.

The image data section 106 is input to the JPEG compression section 106e. The JPEG compression section 106e subjects the input image data to JPEG compression. The compressed image data will be referred to as JPEG data hereinafter. Subsequently, header information is added to the JPEG data, thereby generating a JPEG file. In this embodiment, as the header information, white balance gain in the white balance correction processing, color conversion matrix in the color conversion processing, and image quality mode in image capturing as well as exposure reference values LV0 and LV1 are recorded.

The JPEG file generated by the image processing section 106 in this manner is controlled by the microcomputer 105, and recorded in the recording medium 108. The microcomputer 105 is a control section which is in charge of controlling the entire digital camera 100, and also executes focusing control of the capturing optical system or drive control of the imaging element in the imaging section 101, arithmetic operation controls such as the distance measuring arithmetic operation or the photometric arithmetic operation, and others. Furthermore, a detachable recording medium such as a memory card is assumed as the recording medium 108, but the recording medium 8 may be of a built-in type if data can be transmitted/received between the digital camera 100 and the image processing apparatus.

Moreover, when the image quality mode is set to the raw mode, the header information is added to the raw data output from the analog-to-digital conversion section 102, thereby generating a raw file. The thus generated raw file is recorded in the recording medium 108 under control of the microcomputer 105.

FIG. 3A is a block diagram showing a configuration of a PC 200 as an example of the image processing apparatus 21 depicted in FIG. 1. The PC 200 illustrated in FIG. 3A comprises a file interface 201, a gradation conversion table selection section 202, a gradation conversion table storage section 203, a gradation conversion table correction section 204, a user interface 205, and an image processing section 206. It is to be noted that some of these constituent elements are realized by application software in the PC.

Figure 4:
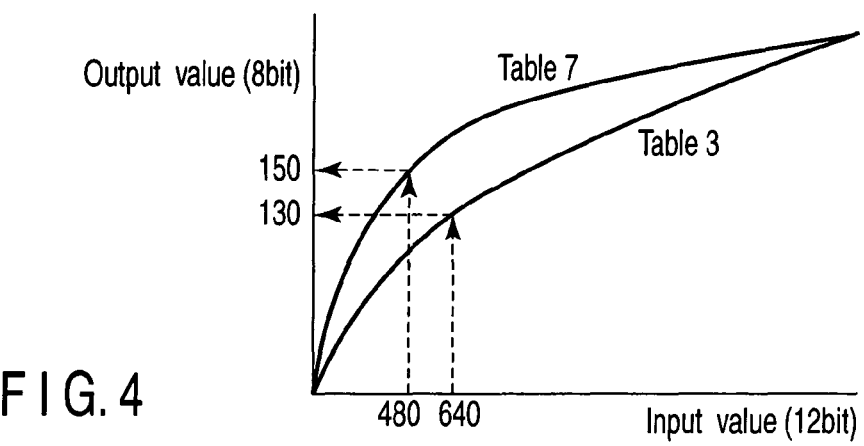
FIG. 4 is a view showing an example of a gradation conversion table.

When the image file 5 is input to the PC 200 through the file interface 201, the gradation conversion table selection section 202 reads the exposure reference values LV0 and LV1 recorded in the image file 5. Then, the gradation conversion table corresponding to LV0 and LV1 is selected from the gradation conversion table storage section 203. FIG. 3B shows a table of the gradation conversion table stored in the gradation conversion table storage section 203. That is, the gradation conversion table storage section 203 stores a plurality of gradation conversion tables (nine tables Table 1 to Table 9 in FIG. 3B) corresponding to a plurality of sets of LV0 and LV1 therein. The gradation conversion table selection section 202 selects the gradation conversion table which is closest to the read set of LV0 and LV1. FIG. 4 shows an example of the gradation conversion tables. At the time of gradation conversion, an input (a pixel value represented by 12 bits of 0 to 4095) from the analog-to-digital conversion section 102 is converted into a pixel value represented by eight bits of 0 to 255 in accordance with the gradation conversion tables shown in FIG. 4.

When changing a contrast of an image is commanded or an exposure correction of an image is instructed through the user interface 205 such as a keyboard or a pointing device, the gradation conversion table correction section 204 corrects the gradation conversion table. In this example, the exposure correction is not carried out by the digital camera 100, but it means exposure correction executed as post-processing of the PC 200.

Figure 5A:
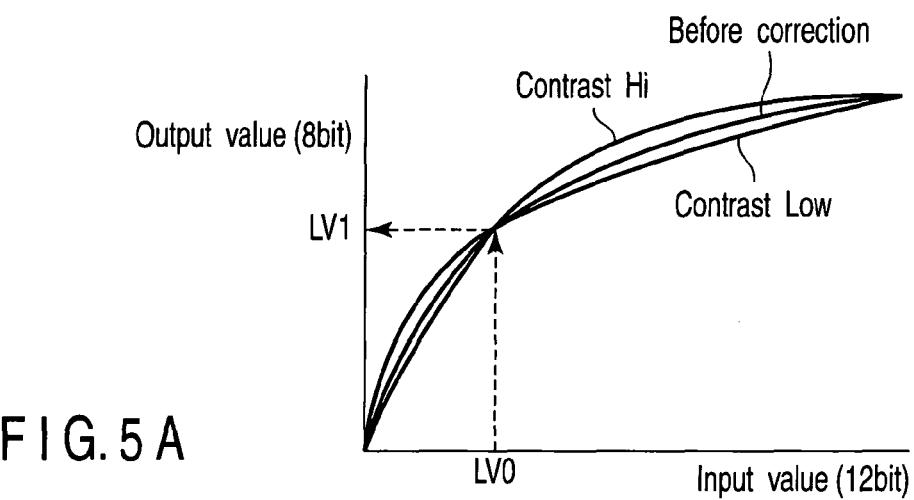
FIG. 5A is a view showing correction of a gradation conversion table based on contrast correction.

A description will now be given as to a correction of the gradation conversion table when a change of contrast is commanded. FIG. 5A is a view showing a correction example of the gradation conversion table based on the contrast change, and FIG. 5B is a view showing gradation characteristic curves of FIG. 5A.

For example, when an increase in contrast of an image is instructed by a user, the gradation conversion table (before the correction) depicted in FIG. 5A is corrected to a gradation conversion table (contrast Hi). On the other hand, when a reduction in contrast of an image is commanded by a user, the gradation conversion table (before the correction) is corrected to a gradation conversion table (contrast Low). Here, when correcting the gradation conversion table in this embodiment, the gradation conversion table is corrected to run through a coordinate of (LV0, LV0) shown in FIG. 5A. This correction can be effected in such a manner that a gradation conversion table is newly generated in accordance with a contrast indicated by a user. Additionally, it is also possible to store a plurality of gradation conversion tables corresponding to contrast changes in the gradation conversion table storage section 203 and select a gradation conversion table from the gradation conversion table storage section 203 in accordance with the contrast indicated by a user. Further, when a gradation conversion table corresponding to the contrast indicated by a user is not stored, a new gradation conversion table may be generated from gradation conversion tables close to that contrast by an interpolation arithmetic operation.

As described above, in this embodiment, since exposure reference values LV0 and LV1 are simultaneously recorded with image data when generating an image file, a gradation conversion table which runs through a coordinate of (LV0, LV1) can be readily generated on the PC 200 side. In this example, as described above, since LV0 and LV1 are values which serve as a reference for an exposure in image capturing, the contrast of an image alone can be changed while maintaining an appropriate exposure by correcting a gradation conversion table without changing these values.

Figure 5B:
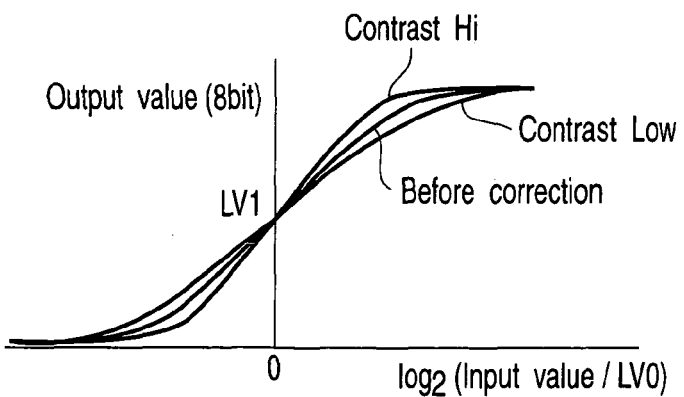
FIG. 5B is a view showing gradation characteristic curves of FIG. 5A.

Furthermore, FIG. 5B represents the gradation characteristic curves of FIG. 5A. Here, in FIG. 5B, since the horizontal axis represents $\log_2$ (an input value/LV0), the vertical axis shows LV1 when the horizontal axis shows 0 (an input value=LV0). A curve before the correction and a curve after the contrast change are both curves which run through (0, LV1), halftone characteristics alone have different curves.

Figure 6A:
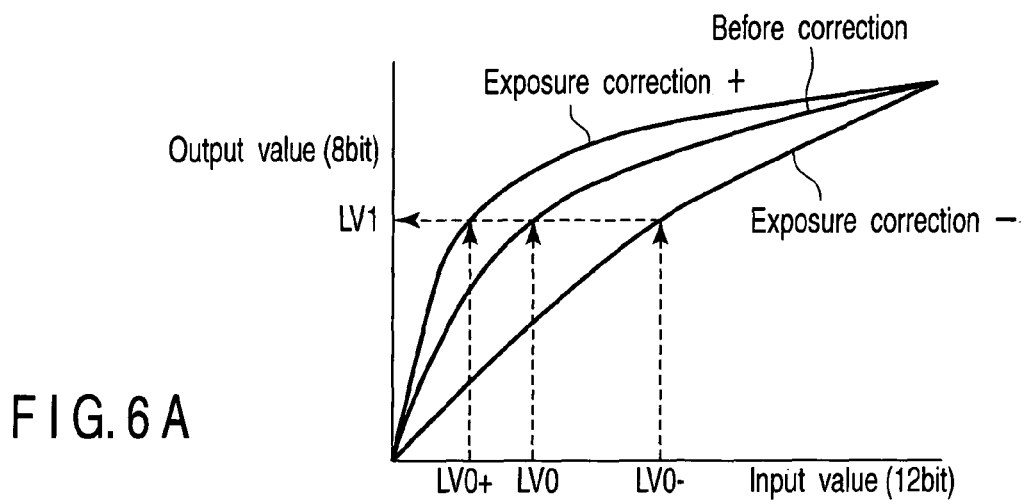
FIG. 6A is a view showing correction of a gradation conversion table based on exposure correction.
Figure 6B:
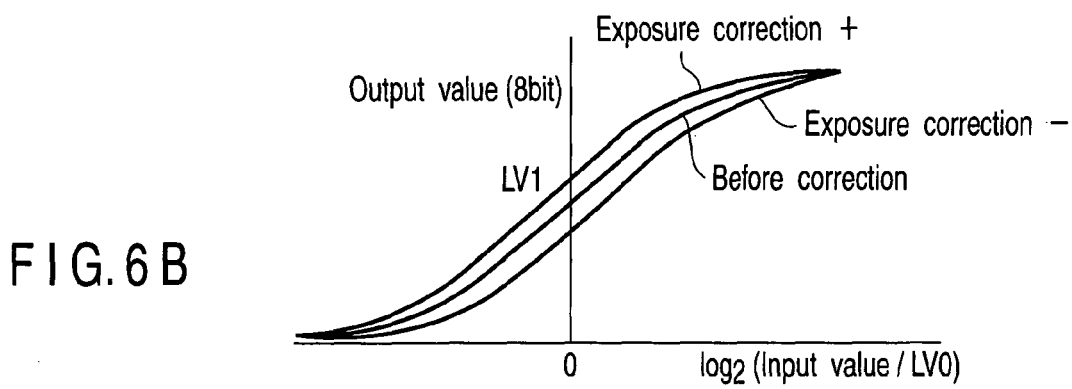
FIG. 6B is a view showing gradation characteristic curves of FIG. 6A.
Figure 6C:
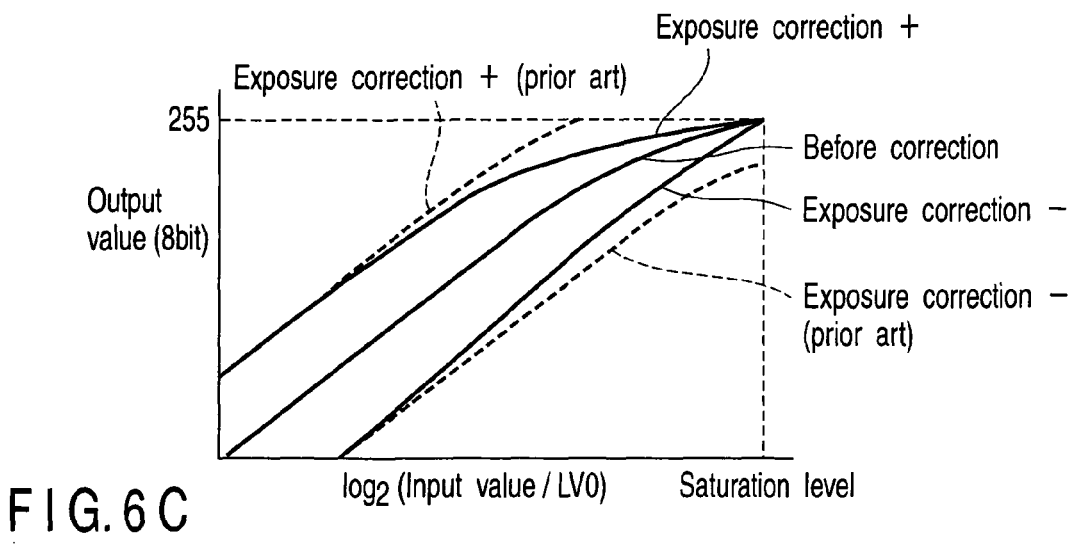
FIG. 6C is an enlarged view showing the vicinity of a saturation area of FIG. 6B.

A description will now be described as to a correction of a gradation conversion table when exposure correction is instructed. FIG. 6A is a view showing a correction of a gradation conversion table based on an exposure correction, and FIG. 6B is a view showing gradation characteristic curves of FIG. 6A. Moreover, FIG. 6C is an enlarged view showing the vicinity of a saturation area of the gradation characteristic curves of FIG. 6B.

For example, when a user instructs to correct the exposure to the positive side, the gradation conversion table (before the correction) shown in FIG. 6A is corrected to a gradation conversion table (exposure correction +). On the other hand, when a user instructs to correct the exposure to the negative side, the gradation conversion table is corrected to a gradation conversion table (exposure correction −) Here, in case of the exposure correction, LV0 is changed based on the following expression:

$LV0$ (after the exposure correction)=$LV0$ (before the exposure correction)×2(−exposure correction value)       (Expression 1)

Then, the gradation conversion table is corrected to run through LV0 (after the exposure correction) and LV1. It is to be noted that LV1 is not a value obtained by subjecting LV0 (after the exposure correction) to gradation conversion, but it is LV1 before the exposure correction. As a result, the exposure of an entire image can be changed without varying the reference exposure. It is to be noted that the exposure correction value is a value indicative of a level of correction performed with respect to the exposure, i.e., a level of a gain with which raw data is amplified. This exposure correction value is specified by a user.

In this embodiment, since LV0 and LV1 are recorded in the image file 5, such an inappropriate exposure correction that an output is saturated or an output does not reach a saturation level (pixel value 255) as indicated by broken lines in FIG. 6C is not carried out. Further, it is possible to perform an appropriate exposure correction taking characteristics of the digital camera side into consideration.

After a gradation conversion table is corrected in accordance with a use application, gradation conversion processing or inverse gradation conversion processing of image data is effected based on the corrected gradation conversion table.

An image processing method which is performed by the image processing system comprising the digital camera 100 and the PC 200 will now be described in detail with reference to a flowchart.

Figure 7:
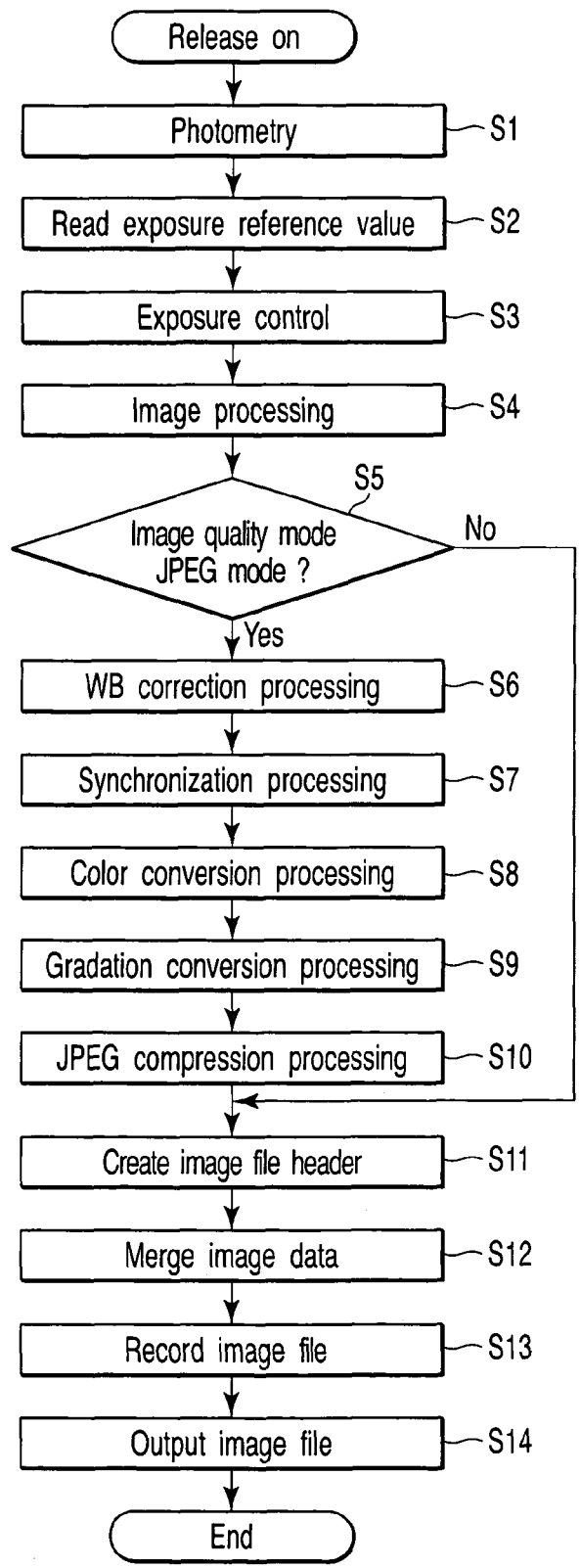
FIG. 7 is a flowchart showing processing on a digital camera side for illustrating an image processing method according to the embodiment of the present invention.

FIG. 7 is a flowchart illustrating a control on the digital camera 100 side. When a non-illustrated release button is turned on, the control of FIG. 7 is started. The photometry is first carried out based on the brightness of an image acquired by the imaging section 101 (step S1). Then, exposure reference values LV0 and LV1 stored in the ROM 107 are read (step S2). Subsequently, an exposure time or the like is calculated based on a result of the photometry at step S1 and the exposure reference values read at step S2. This may be carried out based on an average value of the brightness of the entire image, or it may be performed based on the brightness of a part of the image, e.g., a central portion of the image.

Thereafter, an exposure control is executed based on the calculated exposure time or the like (step S3), and imaging processing such as amplification is performed with respect to a signal obtained from this control (step S4).

Then, whether the image quality mode is the JPEG mode is judged (step S5). If it is determined that the image quality mode is the JPEG mode in the judgment at step S5, the white balance correction processing (step S6), the synchronization processing (step S7), the color conversion processing (step S8), the gradation conversion processing (step S9), and the JPEG compression processing (step S10) are carried out.

Then, header information of the image file is created (step S11), and the created header information and the image data are merged, thereby generating an image file (a JPEG file) (step S12). Furthermore, the generated JPEG file is recorded in the recording medium 108 (step S13).

On the other hand, if it is determined that the image quality mode is not the JPEG mode, namely, it is the raw mode in the judgment at step S5, the processing advances to step S11 from step S5. Moreover, an image file (a raw file) is created like the example of the JPEG file, and the created raw file is recorded in the recording medium 108.

When recording of the image file is terminated, the image file recorded in the recording medium 108 is output to the PC 200 (step S14).

Figure 8:
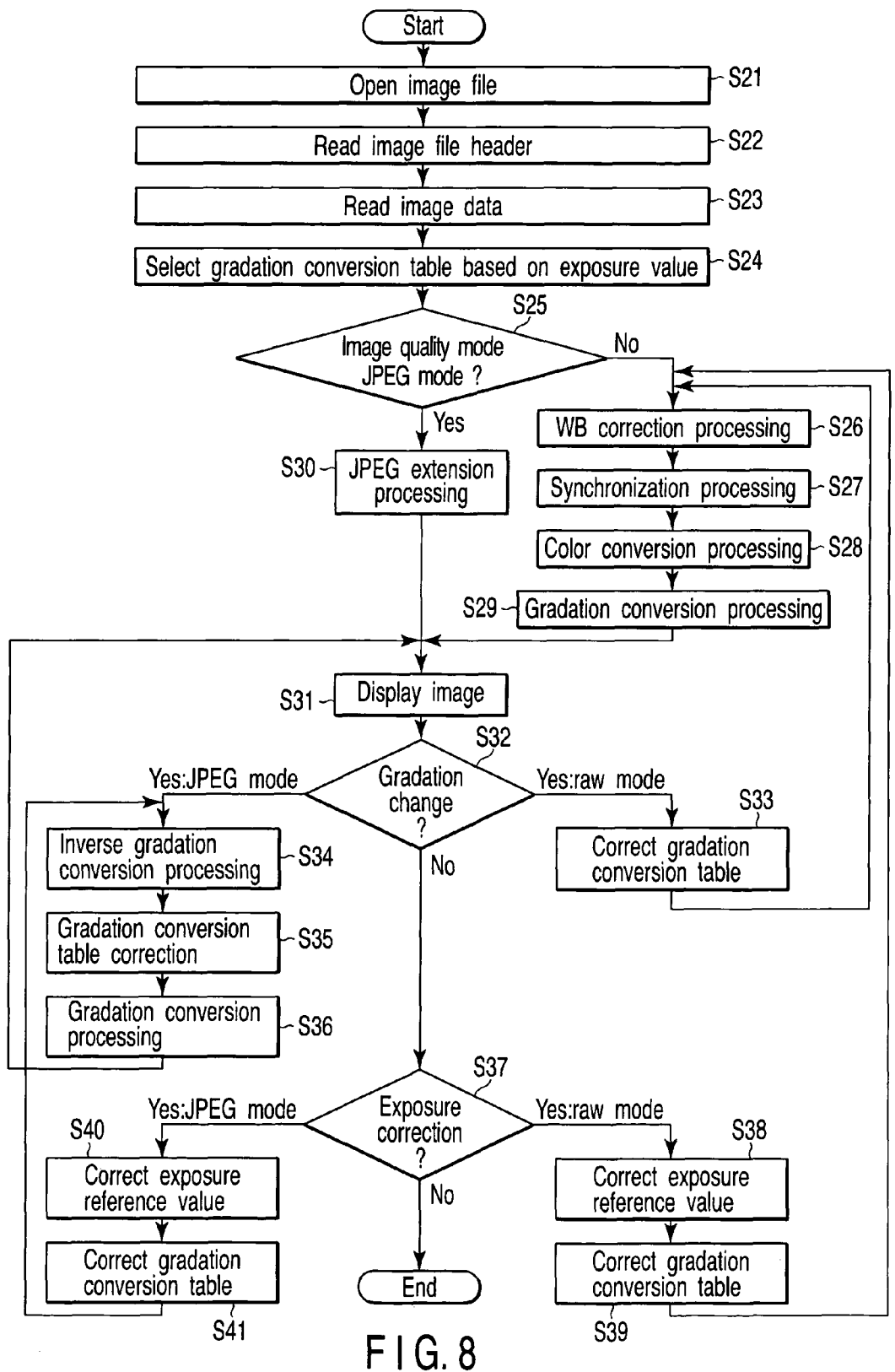
FIG. 8 is a flowchart showing processing on an image processing apparatus side for illustrating an image processing method according to the embodiment of the present invention.

FIG. 8 is a flowchart illustrating a control on the PC 200 side. That is, when the image file is input and this image file is opened by a user (step S21), the header information (step S22) and the image data (step S23) are read. Then, a gradation conversion table is selected based on exposure reference values LV0 and LV1 recorded as the header information of the image file (step S24).

Subsequently, whether the image quality mode of the image data is the JPEG mode is judged based on the header information of the image file (step S25). If it is determined that the image quality mode is not the JPEG mode, namely, it is the raw mode in the judgment at step S25, the white balance correction processing (step S26), the synchronization processing (step S27) and the color conversion processing (step S28) which are equal to those on the digital camera 100 side are executed. Moreover, the gradation conversion processing is effected based on the gradation conversion table selected at step S24 (step S29). On the other hand, if it is determined that the image quality mode is the JPEG mode in the judgment at step S25, the JPEG data is extended (step S30).

After the above-described processing, an image is displayed in a non-illustrated display (step S31). Then, a judgment is made upon whether a gradation change is instructed by a user (step S32).

If it is determined that the gradation change is instructed in the judgment at step S32, processing which differs depending on whether the image quality mode is the raw mode or the JPEG mode is executed. If the image quality mode is the raw mode, the gradation conversion table is corrected as described in connection with FIG. 5A (step S33), and the control then shifts to step S26, thereby performing the image processing. On the other hand, if the image quality mode is the JPEG mode, the inverse gradation conversion processing is carried out with respect to the JPEG extended data (step S34). As a result, image data which is substantially linear with respect to a light quantity of a subject before gradation conversion is generated. Then, the gradation conversion table is corrected (step S35), and the gradation conversion processing based on this corrected gradation conversion table is executed (step S36).

As described above, in this embodiment, if it is determined that the image quality mode is the JPEG mode, the inverse gradation conversion processing is effected before the gradation is changed. As a result, the gradation can be changed with respect to the image data close to the image data in image capturing as compared with an example where the gradation of the JPEG data is directly changed. It is to be noted that the white balance correction or the like may be effected after the inverse gradation conversion processing at step S34.

Additionally, if it is determined that the gradation change is not instructed in the judgment at step S32, a judgment is made upon whether the exposure correction is instructed, i.e., whether an exposure correction value is specified by a user (step S37). If it is determined that the exposure correction is instructed and the image mode is the raw mode in the judgment at step S37, LV0 is corrected in accordance with Expression 1 mentioned above (step S38), then the gradation conversion table is corrected in accordance with this corrected value (step S39). Thereafter, the control returns to step S26. On the other hand, if it is determined that the exposure correction is instructed and the image quality mode is the JPEG mode in the judgment at step S37, LV0 is corrected in accordance with Expression 1 mentioned above (step S40), and the gradation conversion table is then corrected (step S41). Subsequently, the control returns to step S34.

Further, if it is determined that the exposure correction is not instructed in the judgment at step S37, the processing is terminated.

As described above, according to this embodiment, since exposure reference values LV0 and LV1 are recorded as header information when acquiring the raw file, the appropriate gradation conversion processing can be performed with respect to the raw data irrespective of model of camera, design concept of manufacturer or the like. Furthermore, since the quantity of information which is recorded as the header information is small, the transfer rate of an image file is not reduced.

Furthermore, in this embodiment, if it is determined that the image quality mode is the JPEG mode, the inverse gradation conversion processing of the image data is effected, the gradation can be appropriately changed as compared with an example where the gradation or the like of the JPEG data is directly changed.

Moreover, in this embodiment, the exposure reference values are recorded in the image file, and hence the gradation conversion table can be readily and appropriately corrected in order to perform the exposure correction as compared with an example where this processing is manually carried out.

It is to be noted that both LV0 and LV1 are recorded as the exposure reference values together with the image data, but one of these values may be determined as a fixed value and the other one alone may be recorded. For example, LV0 alone which is a value serving as a measurement reference of the ISO sensitivity (LV1=118 [eight bits]) may be recorded. Additionally, bit accuracies of LV0 and LV1 are determined as 12 bits and 8 bits in this embodiment, but the present invention is not restricted thereto. For example, each of LV0 and LV1 may be represented by percentage with respect to a saturation level.

Figure 9:
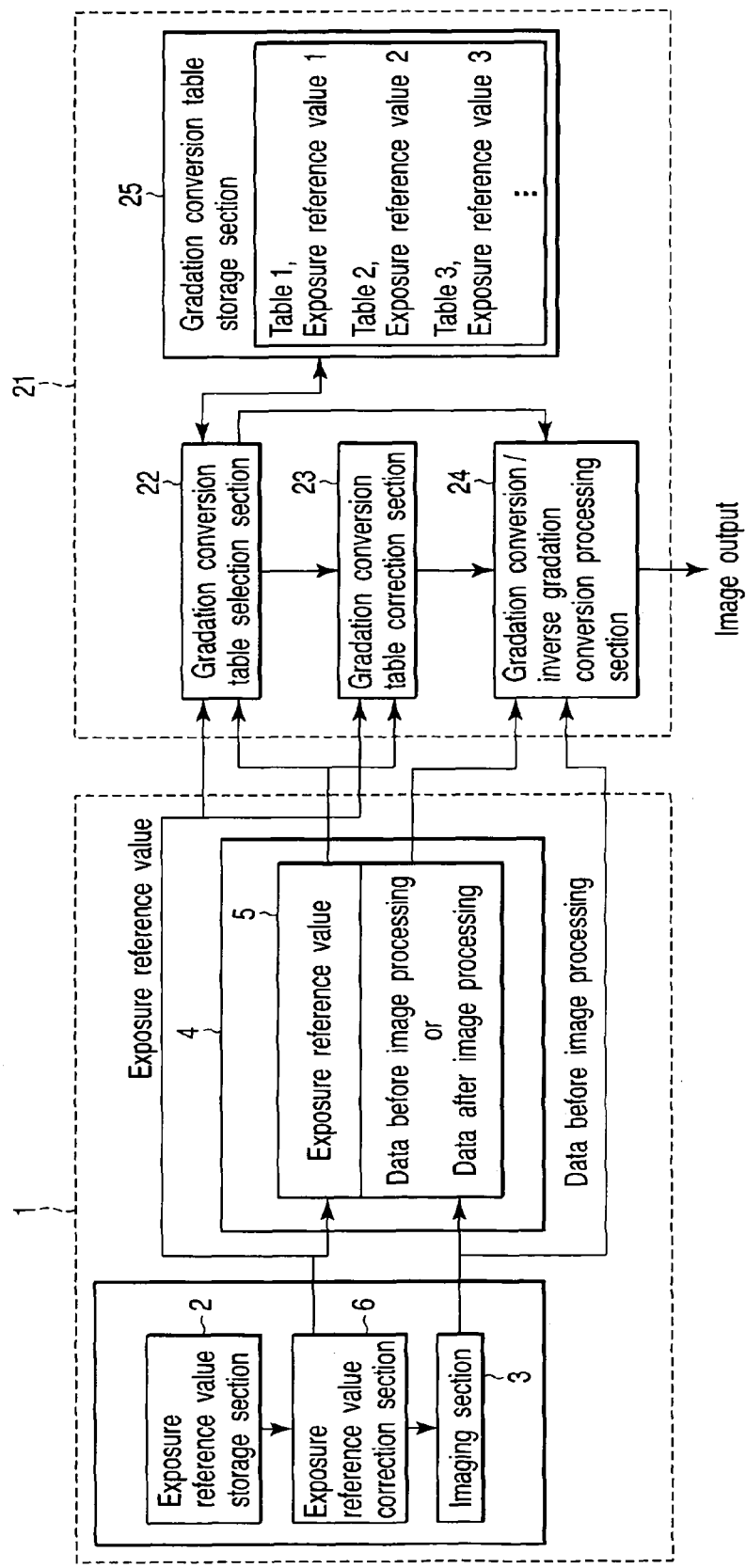
FIG. 9 is a block diagram showing a modification of the present invention.

Further, although exposure reference values LV0 and LV1 are values read from the exposure reference value storage section 2 in this embodiment, such an exposure reference value correction section 6 as shown in FIG. 9 may be provided so that the exposure reference values read from the exposure reference value storage section 2 can be corrected. This exposure reference value correction section 6 corrects the exposure reference values under conditions such as presence/absence of flash lamp emission which is determined based on a photometry result or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An imaging apparatus comprising:
an image acquiring section which images a subject based on an exposure reference value serving as a reference for an exposure in imaging and including both an exposure control target value corresponding to an imaging output value obtained at imaging a uniform surface under automatic exposure control and a value obtained by performing gradation conversion processing for the exposure control target value, to acquire image data to be subjected to at least the gradation conversion processing; and
an image outputting section which outputs the image data obtained by the image acquiring section together with the exposure reference value.

2. The imaging apparatus according to claim 1, wherein the image data is image data before gradation conversion processing is performed.

3. The imaging apparatus according to claim 1, wherein the image data is image data after gradation conversion processing and compression processing are performed.

4. The imaging apparatus according to claim 1, further comprising a recording section which records the image data and the exposure reference value corresponding to the image data as one image file.

5. The imaging apparatus according to claim 4, wherein the recording section includes a recording medium which is detachable with respect to the imaging apparatus.

6. The imaging apparatus according to claim 1, further comprising an exposure reference value storing section which stores the exposure reference value,
the image acquiring section reading the exposure reference value from the exposure reference value storing section to perform the imaging.

7. The imaging apparatus according to claim 1, further comprising:
an exposure reference value storing section which stores the exposure reference value; and
an exposure reference value correcting section which corrects the exposure reference value read from the exposure reference value storing section, and
the image acquiring section correcting the exposure reference value read from the exposure reference value storing section by the exposure reference value correcting section, and then performing the imaging.

8. The imaging apparatus according to claim 1, wherein the exposure reference value includes at least one of an exposure control target value as a target of an exposure control in the imaging and a value obtained by performing gradation conversion processing with respect to the exposure control target value.

9. The imaging apparatus according to claim 1, wherein the exposure reference value is a value corresponding to a reference pixel value which is used to measure a sensitivity.

10. An image processing apparatus comprising:
an image inputting section which, based on an exposure reference value serving as a reference for an exposure in imaging and including both an exposure control target value corresponding to an imaging output value obtained at imaging a uniform surface under automatic exposure control and a value obtained by performing gradation conversion processing for the exposure control target value, inputs image data to be subjected to at least the gradation conversion processing;
an exposure reference value inputting section which inputs the exposure reference value;
a gradation conversion table storing section which stores gradation conversion tables corresponding to the plurality of exposure reference values;
a gradation conversion table selecting section which selects a gradation conversion table corresponding to the exposure reference value input by the exposure reference value inputting section from the plurality of gradation tables stored in the gradation conversion table storing section; and
a gradation conversion processing section which performs gradation conversion processing with respect to the image data input by the image inputting section based on the gradation conversion table selected by the gradation conversion table selecting section.

11. The image processing apparatus according to claim 10, wherein the image data is image data before the gradation conversion processing is performed.

12. The image processing apparatus according to claim 10, wherein the image data is image data after the gradation conversion processing and compression processing are carried out, and the image processing apparatus further comprises an inverse gradation conversion processing section which performs processing corresponding to inverse conversion processing of the gradation conversion processing with respect to the image data input by the image inputting section based on the gradation conversion table selected by the gradation conversion table selecting section.

13. The image processing apparatus according to claim 10, further comprising:
an indicating section which indicates gradation characteristics of an image; and
a gradation conversion table correcting section which corrects the gradation conversion table selected by the gradation conversion table selecting section in accordance with the gradation conversion characteristics of the image indicated by the indicating section.

14. The image processing apparatus according to claim 13, wherein the gradation characteristics of the image indicated by the indicating section include at least a contrast of the image.

15. The image processing apparatus according to claim 14, wherein the gradation conversion table correcting section corrects the gradation conversion table in such a manner that the exposure reference value is not changed when the contrast of the image is indicated by the indicating section.

16. An image processing apparatus comprising:
an image inputting section which, based on an exposure reference value serving as a reference for an exposure in imaging and including both an exposure control target value corresponding to an imaging output value obtained at imaging a uniform surface under automatic exposure control and a value obtained by performing gradation conversion processing for the exposure control target value, inputs image data to be subjected to at least the gradation conversion processing;
an exposure reference value inputting section which inputs the exposure reference value;
an indicating section which indicates an exposure correction value which is used for correcting an exposure of an image;
an exposure reference value changing section which changes the exposure reference value based on the exposure correction value indicated by the indicating section;
a gradation conversion table storing section which stores gradation conversion tables corresponding to the plurality of exposure reference values;
a gradation conversion table selecting section which selects a gradation conversion table corresponding to the exposure reference value changed by the exposure reference value changing section from the plurality of gradation conversion tables stored in the gradation conversion table storing section; and
a gradation conversion processing section which performs the gradation conversion processing with respect to the image data input by the image inputting section based on the gradation conversion table selected by the gradation conversion table selecting section.

17. An image processing apparatus comprising:
an image inputting section which, based on an exposure reference value serving as a reference for an exposure in imaging and including both an exposure control target value corresponding to an imaging output value obtained at imaging a uniform surface under automatic exposure control and a value obtained by performing gradation conversion processing for the exposure control target value, inputs image data to be subjected to at least the gradation conversion processing;
an exposure reference value inputting section which inputs the exposure reference value;
a gradation conversion table storing section which stores gradation conversion tables corresponding to the plurality of exposure reference values;
a gradation conversion table selecting section which selects a gradation conversion table corresponding to the exposure reference values input by the exposure reference value inputting section from the plurality of gradation conversion tables stored in the gradation conversion table storing section;
an indicating section which indicates an exposure correction value which is used to correct an exposure of an image;
an exposure reference value changing section which changes the exposure reference value based on the exposure correction value indicated by the indicating section;
a gradation conversion table correcting section which corrects the gradation conversion table selected by the gradation conversion table selecting section in accordance with the exposure reference value changed by the exposure reference value changing section; and
a gradation conversion processing section which performs the gradation conversion processing with respect to the image data input by the image inputting section based on the gradation conversion table corrected by the gradation conversion table correcting section.

18. The image processing apparatus according to claim 16, wherein the exposure reference value includes at least one of an exposure control target value as a target of an exposure control in the imaging and a value obtained when the gradation conversion processing is performed with respect to the exposure control target value.

19. The image processing apparatus according to claim 17, wherein the exposure reference value includes at least one of an exposure control target value as a target of an exposure control in the imaging and a value obtained when the gradation conversion processing is performed with respect to the exposure control target value.

20. The image processing apparatus according to claim 16, wherein the exposure reference value includes the exposure control target value as a target of an exposure control in the imaging and a value obtained when the gradation conversion processing is performed with respect to the exposure control target value,
the exposure reference value changing section changes the exposure control target value in the exposure reference value,
the gradation conversion table storing section further stores the gradation conversion table as well as a plurality of gradation conversation tables corresponding to changes in the exposure control target value of the gradation conversion table, and
the gradation conversion table selecting section further performs selection of the gradation conversion table corresponding to the changed exposure control target value from the plurality of gradation tables stored in the gradation conversion table storing section.

21. The image processing apparatus according to claim 17, wherein the exposure reference value includes the exposure control target value as a target of an exposure control in the imaging and a value obtained when the gradation conversion processing is performed with respect to the exposure control target value, the exposure reference value changing section changes the exposure control target value in the exposure reference value, and the gradation conversion table correcting section corrects the gradation conversion table in such a manner that a value obtained by performing the gradation conversion processing is not changed when correcting the gradation conversion table.

22. An image processing system comprising:

an imaging apparatus comprising:

an image acquiring section which images a subject based on an exposure reference value serving as a reference for an exposure in imaging and including both an exposure control target value corresponding to an imaging output value obtained at imaging a uniform surface under automatic exposure control and a value obtained by performing gradation conversion processing for the exposure control target value, to acquire image data to be subjected to at least the gradation conversion processing; and an image outputting section which outputs the image data acquired by the image acquiring section together with the exposure reference value; and an image processing apparatus comprising:

an image inputting section which inputs the image data and the exposure reference value output by the image outputting section;

a gradation conversion table storing section which stores gradation conversion tables corresponding to the plurality of exposure reference values;

a gradation conversion table selecting section which selects a gradation conversion table corresponding to the exposure reference value input by the image inputting section from the plurality of gradation tables stored in the gradation conversion table storing section; and a gradation conversion processing section which performs gradation conversion processing with respect to the image data input by the image inputting section based on the gradation conversion table selected by the gradation conversion table selecting section.

23. The image processing system according to claim 22, wherein the image data is image data before the gradation conversion processing is performed.

24. The image processing system according to claim 22, wherein the image data is image data after the gradation conversion processing and compression processing are performed, and the image processing apparatus further comprises an inverse gradation conversion processing section which performs processing corresponding to inverse conversion processing of the gradation conversion processing with respect to the image data input by the image inputting section based on the gradation conversion table selected by the gradation conversion table selecting section.

25. The image processing system according to claim 22, wherein the imaging apparatus further comprises an exposure reference value storing section for storing the exposure reference value, and the image acquiring section reads the exposure reference value from the exposure reference value storing section to perform the imaging.

26. The image processing system according to claim 22, wherein the imaging apparatus further comprises:

an exposure reference value storing section which stores the exposure reference value; and an exposure reference value correcting section which corrects the exposure reference value read from the exposure reference value storing section, and the image acquiring section corrects the exposure reference value read from the exposure reference value storing section, and then perform the imaging.

27. The image processing system according to claim 22, wherein the image processing apparatus further comprises:

an indicating section which indicates gradation characteristics of an image; and a gradation conversion table correcting section which corrects the gradation conversion table selected by the gradation conversion table selecting section in accordance with the gradation characteristics of the image indicated by the indicating section.

28. An image processing system comprising:

an imaging apparatus comprising:

an image acquiring section which images a subject, based on an exposure reference value serving as a reference for an exposure in imaging and including both an exposure control target value corresponding to an imaging output value obtained at imaging a uniform surface under automatic exposure control and a value obtained by performing gradation conversion processing for the exposure control target value, to acquire image data to be subjected to at least the gradation conversion processing;

an exposure reference value storing section which stores an exposure reference value as a reference of an exposure in imaging by the image acquiring section; and an image outputting section which outputs the image data acquired by the image acquiring section together with the exposure reference value stored in the exposure reference value storing section; and an image processing apparatus comprising:

an image inputting section which inputs the image data and the exposure reference value output by the image outputting section;

an indicating section which indicates an exposure correction value which is used to correct an exposure of an image;

an exposure reference value changing section which changes the exposure reference value based on the exposure correction value indicated by the indicating section;

a gradation conversion table storing section which stores gradation conversion tables corresponding to the plurality of exposure reference values;

a gradation conversion table selecting section which selects a gradation conversion table corresponding to the exposure reference value changed by the exposure reference value changing section from the plurality of gradation tables stored in the gradation conversion table storing section; and a gradation conversion processing section which performs the gradation conversion processing with respect to the image data input by the inputting section based on the gradation conversion table selected by the gradation conversion table selecting section.

29. An image processing system comprising:

an imaging apparatus comprising:

an image acquiring section which images a subject, based on an exposure reference value serving as a reference for an exposure in imaging and including both an exposure control target value corresponding to an imaging output value obtained at imaging a uniform surface under automatic exposure control and a value obtained by performing gradation conversion processing for the exposure control target value, to acquire image data to be subjected to at least the gradation conversion processing;

an exposure reference value storing section stores an exposure reference value as a reference for an exposure in imaging by the image acquiring section; and an image outputting section which outputs the image data acquired by the image acquiring section together with the exposure reference value stored in the exposure reference value storing section; and an image processing apparatus comprising:

an image inputting section which inputs the image data and the exposure reference value output by the image outputting section;

a gradation conversion table storing section which stores gradation conversion tables corresponding to the plurality of exposure reference values;

a gradation conversion table selecting section which selects a gradation conversion table corresponding to the exposure reference value input by the inputting section from the plurality of gradation tables stored in the gradation conversion table storing section;

an indicating section which indicates an exposure correction value which is used to correct an exposure of an image;

an exposure reference value changing section which changes the exposure reference value based on the exposure correction value indicated by the indicating section;

a gradation conversion table correcting section which corrects the gradation conversion table selected by the gradation conversion table selecting section in accordance with the exposure reference value changed by the exposure reference value changing section; and a gradation conversion processing section which performs the gradation conversion processing with respect to the image data input by the inputting section based on the gradation conversion table corrected by the gradation conversion table correcting section.

30. An image processing method comprising:

imaging a subject based on an exposure reference value serving as a reference for an exposure in imaging and including both an exposure control target value corresponding to an imaging output value obtained at imaging a uniform surface under automatic exposure control and a value obtained by performing gradation conversion processing for the exposure control target value, to acquire image data to be subjected to at least the gradation conversion processing;

outputting the acquired image data and the exposure reference value;

selecting a gradation conversion table corresponding to the output exposure reference value from a plurality of gradation conversion tables; and performing gradation conversion processing with respect to the output image data based on the selected gradation conversion table.

31. The image processing method according to claim 30, further comprising reading the exposure reference value from a storage section prior to acquiring the image data.

32. The image processing method according to claim 30, further comprising:

reading the exposure reference value from a storage section prior to acquiring the image data; and correcting the read exposure reference value.

33. The image processing method according to claim 30, further comprising:

indicating gradation characteristics of an image; and correcting the selected gradation conversion table in accordance with the indicated gradation characteristics of the image.

34. An image processing method comprising:

imaging a subject, based on an exposure reference value serving as a reference for an exposure in imaging and including both an exposure control target value corresponding to an imaging output value obtained at imaging a uniform surface under automatic exposure control and a value obtained by performing gradation conversion processing for the exposure control target value, to acquire image data to be subjected to at least the gradation conversion processing;

outputting the acquired image data and the exposure reference value;

indicating an exposure correction value which is used to correct an exposure of the image;

changing the exposure reference value based on the indicated exposure correction value;

selecting a gradation conversion table corresponding to the changed exposure reference value from a plurality of gradation conversion tables; and performing the gradation conversion processing to the output image data based on the selected gradation conversion table.

35. An image processing method comprising:

imaging a subject, based on an exposure reference value serving as a reference for an exposure in imaging and including both an exposure control target value corresponding to an imaging output value obtained at imaging a uniform surface under automatic exposure control and a value obtained by performing gradation conversion processing for the exposure control target value, to acquire image data to be subjected to at least the gradation conversion processing;

outputting the acquired image data and the exposure reference value;

selecting a gradation conversion table corresponding to the output exposure reference value from a plurality of gradation conversion tables;

indicating an exposure correction value which is used to correct an exposure of the image;

changing the exposure reference value based on the indicated exposure correction value;

correcting the selected gradation conversion table in accordance with the changed exposure reference value; and performing the gradation conversion processing to the output image data based on the corrected gradation conversion table.

* * * * *